United States Patent
McDonnell et al.

(10) Patent No.: US 6,259,497 B1
(45) Date of Patent: Jul. 10, 2001

(54) LARGE AREA LIQUID CRYSTAL DISPLAYS

(75) Inventors: Damien G McDonnell; John C Jones, both of Worcester; Ian R Mason, West Midlands; James T Smith, Worcester, all of (GB)

(73) Assignee: The Secretary of State for Defence in Her Brittanic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 08/122,416

(22) PCT Filed: Mar. 25, 1992

(86) PCT No.: PCT/GB92/00546

§ 371 Date: Jan. 21, 1994

§ 102(e) Date: Jan. 21, 1994

(87) PCT Pub. No.: WO92/17814

PCT Pub. Date: Oct. 15, 1992

(30) Foreign Application Priority Data

Mar. 28, 1991 (GB) .................................................. 9106720

(51) Int. Cl.$^7$ ................................................ G02F 1/1345
(52) U.S. Cl. ..................................................... 349/73
(58) Field of Search ................................ 359/62, 82, 58, 359/87, 88; 349/73, 139

(56) References Cited

U.S. PATENT DOCUMENTS

| | | | |
|---|---|---|---|
| 3,861,783 | | 1/1975 | Dill et al. .............................. 350/160 |
| 4,408,836 | * | 10/1983 | Kikuno ................................... 359/82 |
| 4,806,922 | | 2/1989 | McLaughlin et al. ................ 340/784 |
| 4,832,457 | | 5/1989 | Saitoh et al. ......................... 350/334 |
| 4,906,071 | * | 3/1990 | Takahara et al. ...................... 359/82 |
| 5,018,840 | * | 5/1991 | Ogawa .................................. 359/51 |
| 5,106,197 | * | 4/1992 | Ohuchida et al. ..................... 359/83 |
| 5,113,270 | * | 5/1992 | Fergason ............................... 359/51 |
| 5,206,749 | * | 4/1993 | Zavracky et al. ...................... 359/82 |
| 5,258,320 | * | 11/1993 | Zavracky et al. ...................... 437/40 |
| 5,339,180 | * | 8/1994 | Katoh .................................... 359/58 |

FOREIGN PATENT DOCUMENTS

| | | |
|---|---|---|
| 2 139 537 | 1/1973 | (FR) . |
| 1 522 520 | 8/1978 | (GB) . |
| 2 058 427 | 4/1981 | (GB) . |

OTHER PUBLICATIONS

Saunders et al.; "New Photostable Anthraquinone Dyes With High Order Parameters"; 1982 International Display Research Conference; IEEE; 1982; pp. 121–125.

Kaneko, "Transistor Switch Matrix Addressed Liquid Crystal TV Displays"; KTK Scientific Publishers; Chapter 7, 1987.

West; "Phase Separation of Liquid Crystals in Polymers"; Mol. Cryst. Liq. Cryst. Inc. Nonlin. Opt., vol. 157, 1988, pp. 427–441.

Drzaic; "Reorientation Dynamics of Polymer Dispersed Nematic Liquid Crystal Films"; Liquid Crystals; 1988, vol. 3, No. 11, pp. 1543–1559.

* cited by examiner

Primary Examiner—Kenneth Parker
(74) Attorney, Agent, or Firm—Nixon & Vanderhye P.C.

(57) ABSTRACT

A large area liquid crystal display comprises a layer of liquid crystal material between two cell walls. One cell wall has a common sheet electrode. The other cell walls comprise a plurality of addressing tiles electrically connected together. Driver circuits at the display edges apply addressing voltages. Each addressing tiles comprises a series of m data electrodes and n gate electrodes arranged to form an m×n matrix array of electrode intersections. At each intersection is a pixel patch electrode and a non linear element connected to adjacent source and gate electrodes and to the pixel electrode. The data and gate electrodes continue across the tile surface and around its edges. Adjacent tiles are electrically connected together by an anisotropic glue, or by solder bumps, or electrical bridges. The liquid crystal material may be encapsulated in a polymer matrix or be a non-encapsulated layer. Dyes may be incorporated in the liquid crystal material. The pixel electrode may be formed as a group of three independently addressed electrodes each providing a different color so the display may be a multi-color display.

7 Claims, 4 Drawing Sheets

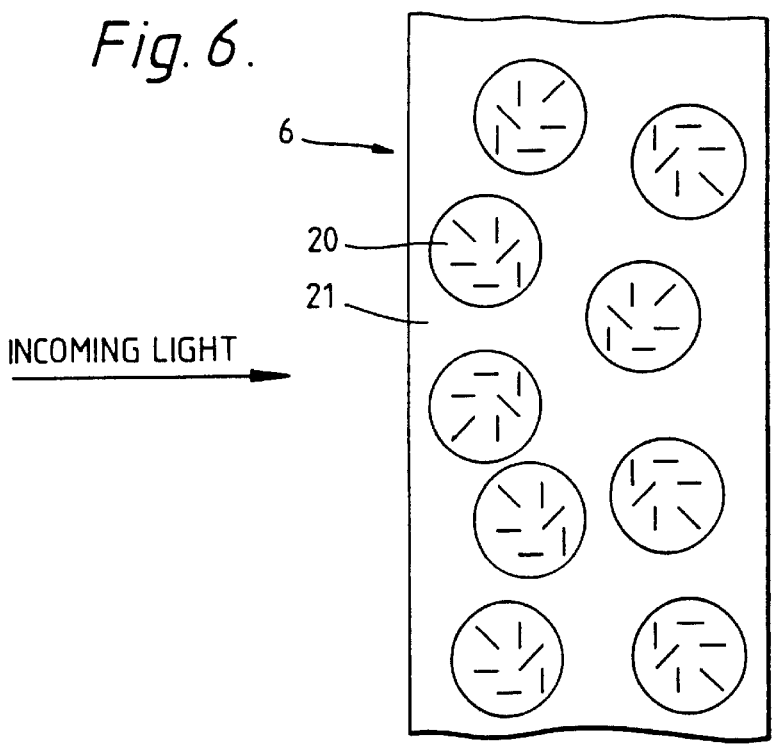
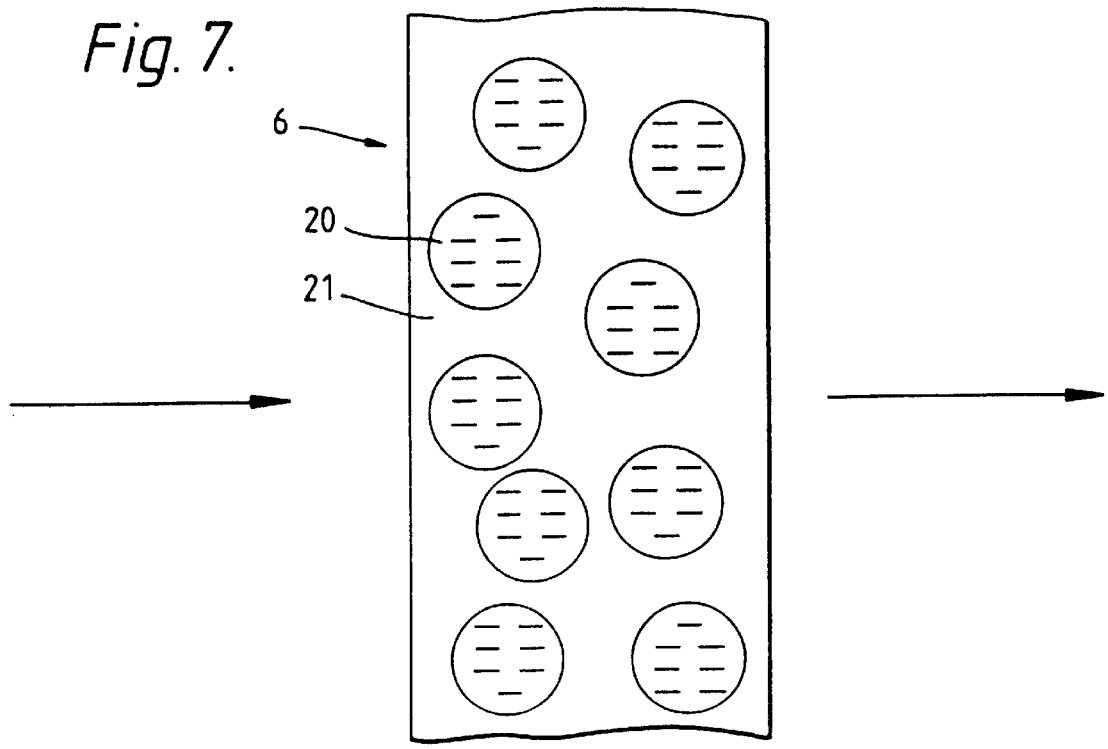

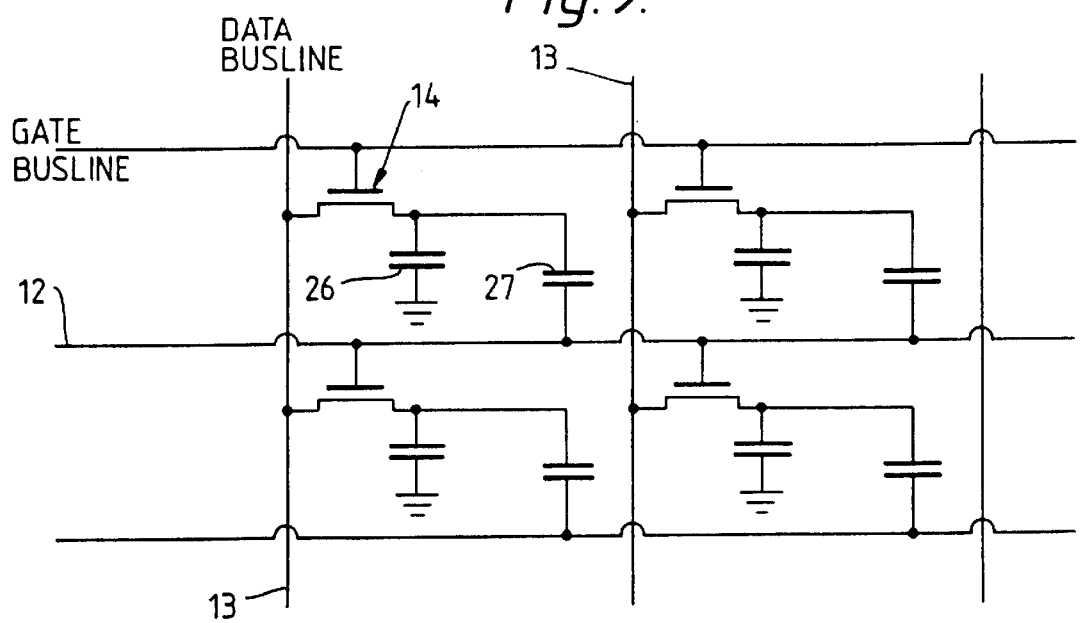
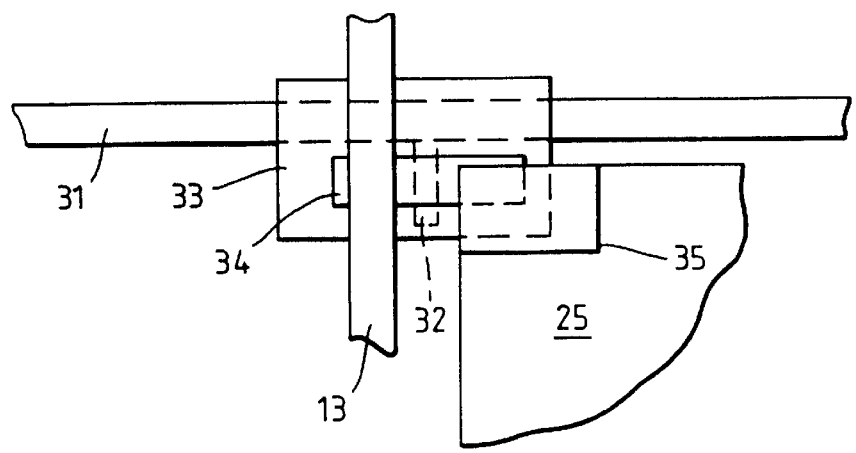
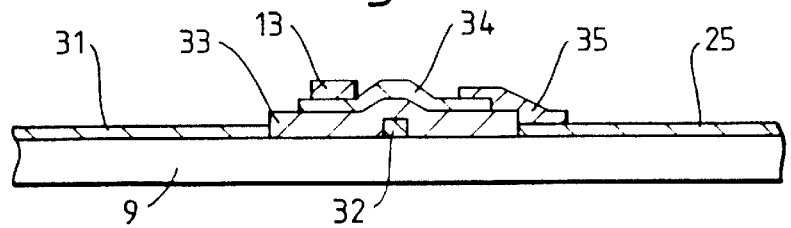

LARGE AREA LIQUID CRYSTAL DISPLAYS

BACKGROUND OF THE INVENTION

1. Field of the Invention

This invention concerns large area liquid crystal displays. Such displays are useful as televisions, notice boards, or maps in public areas to give information readable at distances of many meters. Also such displays are useful in large area high definition television receivers.

2. Discussion of Prior Art

Liquid crystal displays are well known devices which rely on an electric field induced change of molecular ordering in liquid crystal materials. In one known type of device a layer of liquid crystal material is contained between two sheets of glass. Transparent electrodes are coated on the inner faces of these sheets and are used to apply an electric field across the liquid crystal layer. Upon application of a suitable electric field the liquid crystal molecules change their alignment, and this gives rise to a visible change. There are many types of devices using this effect, for example a twisted nematic, a phase change, etc. To increase the number of bits of information that can be displayed it is common to form the electrodes into row and columns making an x,y matrix of electrode intersections, termed a pixel of information. By applying an appropriate voltage to a row and a column each intersection can be switched in turn. The known technique for addressing such a matrix is multiplex addressing. This involves indexing a WRITE pulses onto each row in turn whilst appropriate DATA voltages (eg plus or minus DATA) are applied to each column electrode. The display is continually refreshed by repeating the addressing sequence.

A disadvantage of devices using glass sheets is the precise control of liquid crystal layer thickness and the filling of the small, typically 8 µm, space between sheets.

These problems have to some extent been overcome by encapsulating liquid crystal droplets in a polymer matrix and forming the result into sheets of controlled thickness. Such sheets are variously known as Nematic Curvilinear Aligned Phase (NCAP), Polymer Dispersed Liquid Crystal (PDLC), Polymer Networked Liquid Crystal (PNLC), and are described for example in Mol. Cryst. Liq Cryst. Inc. Nonlin. Opt. (1988) 157 pages 427–441, Liquid crystal Crystals (1988) 3(11) 1543–1559, U.S. Pat. No. 4,435.047, U.S. Pat. No. 4,688,900, French Patent 72,17274, and Application GB 89 28,282.6. These polymer sheets can be enclosed between cell walls carrying electrodes and addressed as for the conventional cells described above.

A problem common to the conventional glass walled liquid crystal cell and those using sheets of polymer encapsulated liquid crystal is that of addressing very large displays. The term large applies both to the physical size and to the amount of information displayed. Glass walled cells are difficult to manufacture in physically large sizes. Both these and those cells using polymer encapsulated liquid crystal material are difficult to address when the number of separately addressable pixels becomes large. The reason for this is that each pixel needs to be re addressed during each frame time. A frame time is the time taken to address the whole display once; the display is continually addressed one frame after another. The reason each pixel needs repeated addressing is that the liquid crystal molecules can relax back to an OFF state a relatively short time after receiving a voltage turning them into an ON state: i.e. the materials are monostable.

Two approaches have been used to overcome this relaxing back to an OFF state. One uses chiral smectic liquid crystal materials in a device which is bistable, ie the material remains in one state arbitrarily defined as OFF or ON once switched. The other approach uses non linear elements associated with each addressable pixel. With these displays one cell wall is formed as a sheet ground electrode and pixels are defined by shaped electrode patches on the other cell wall. Between the pixel patches are source and gate bus lines with a non linear device at each bus line intersection associated with each pixel patch. Multiplex addressing is used as above but the voltage waveforms and timing is different. Many high quality displays have been produced using switches at each pixel, these have been used for television type displays.

The non linear elements are formed by conventional photolithographic techniques on glass walls used for liquid crystal cells. As with all manufacturing techniques for making various solid state devices, eg field effect transistors, etc, not all devices produced on a large sheet will work correctly. This is termed the yield; it is difficult to make a large sheet with every device a working device. For a satisfactory display each non linear element must work correctly. The larger the number of switches on a substrate the greater the chance of one or more switch not working, i.e. the yield is lower. Thus although it may be theoretically possible to produce a very large number of switches on a substrate, and hence produce a very large liquid crystal display, it is not practical to produce large displays with a commercially useful yield.

One way of overcoming this problem is to use a number of separate and independent displays and join them together. This has been done with television screens with each screen arranged to display a portion of a whole scene. Unfortunately the joins between screens spoils the display.

As an alternative to television screens patent GB 1,522, 520 describes a matrix of independent liquid crystal cells each separately addressable to collectively display information. The apparent gap between each cells is bridged by a fibre optical wedge so that from a distance the gap between each cell appears to be non existent. In practice this arrangement was bulky and difficult to manufacture.

SUMMARY OF THE INVENTION

The present invention overcomes the above problems by using a matrix of small individual liquid crystal addressing tiles joined together to form one large composite cell wall that is used in conjunction with a layer of liquid crystal material and a further cell wall and multiplex addressing from the edges.

According to this invention a large area liquid crystal display comprises:

- a layer of liquid crystal material arranged between two cell walls,
- one cell wall being provided with a common electrode.
- the other wall being provided on one surface with a series of m data electrodes and a series of n gate electrodes arranged to form an m×n matrix of electrode intersections with a pixel shaped electrode patch at each intersection and a non linear element associated with each pixel patch electrode, the non linear element being connected between an adjacent data and gate electrode and to the pixel electrode.

and data and gate electrode driver circuits for applying addressing voltages to each pixel, Characterised In That:

the layer of liquid crystal material is a layer of polymer material encapsulating liquid crystal material, the second wall is formed by a plurality of separate optically transparent addressing tiles electrically connected together to form a large single addressing cell wall, each tile comprising a substrate carrying data, gate, and pixel patch electrodes with an associated non linear element arranged in an m×n matrix, the data and gate electrodes being continued across the tile surface and at least across a part of the tile edge surface, and means are provided for electrically joining the source and gate electrodes on adjacent tiles.

The layer of liquid crystal material may be a continuous layer of liquid crystal material contained between two cell walls, or a layer of polymer material encapsulating liquid crystal material. The polymer material may be stretched to elongate pores containing the liquid crystal material.

The electrodes on each separate cell may be continued round the cell edges or may electrically pass through the cell near the edges to emerge and terminate in contact pads on the reverse side.

The separate cells may be electrically connected together at their edges by unidirectionally conductive adhesive, by a series of solder strips, or by conductive bridges on the reverse of the cell.

Each separate cell may be tested for correct operation of each non linear element prior to joining with another cell, then each joined combination tested prior to further joining. Thus two cells may be tested then joined to form a 2×2 composite cell, then four such cells joining to give a 4×4 composite cell etc. In this manner a large composite cell may be made with every non linear element working correctly.

The common electrode may be single sheet electrode or a series of shaped electrodes.

Dyes may be included in the liquid crystal material to improve the contrast ratio between ON and OFF states. Suitable dyes are pleochroic dyes or the anthraquinone dyes described in IEEE SID, International Display Research Conf October 1982 page 121–125.

The pixel electrode may be formed as a single pixel or be divided into three independently address electrode each associated with a different colour filter. The common electrode may be a single sheet electrode or a series of electrodes each associated with a single pixel or single column or row of pixels.

BRIEF DESCRIPTION OF THE DRAWINGS

The invention will now be described, by way of example only, with reference to the accompanying drawings of which:

FIG. 6 is a sectional view of a layer of polymer encapsulating liquid crystal material when no voltage is applied across the layer;

FIG. 7 is the similar to FIG. 6 but with an applied voltage;

FIG. 9 is a circuit diagram of a switched matrix display incorporating thin film transistors at each display pixel;

FIGS. 10, 11 are plan and sectional views of one construction of the display of FIG. 9.

DETAILED DISCUSSION OF PREFERRED EMBODIMENT

Figure 1:
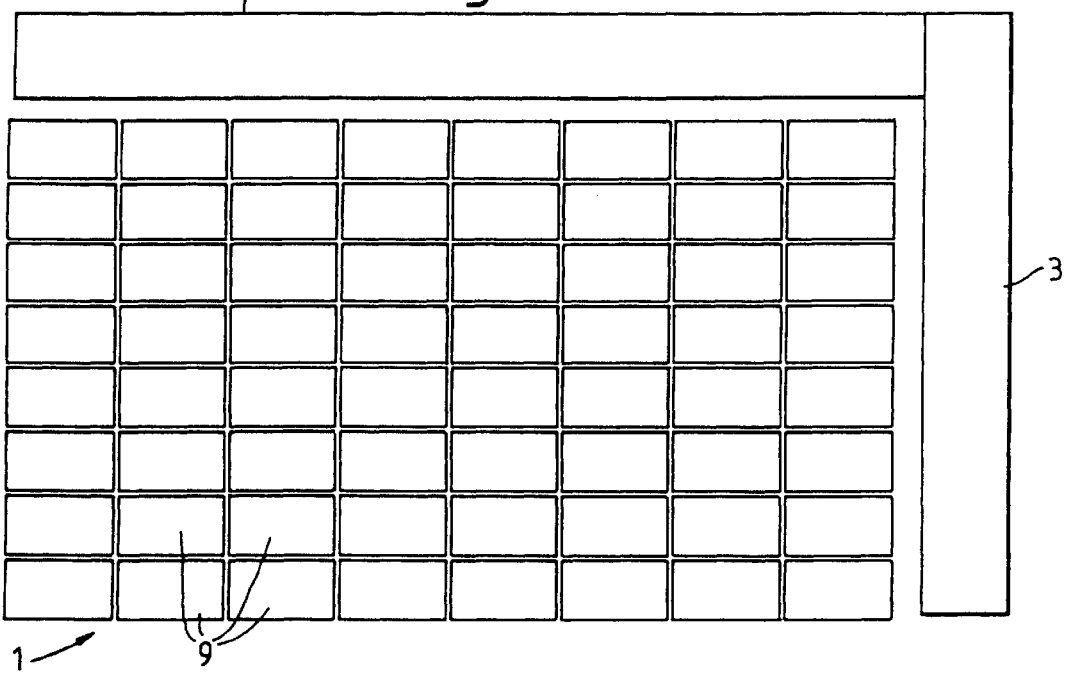
FIG. 1 is a plan view of the invention.
Figure 2:
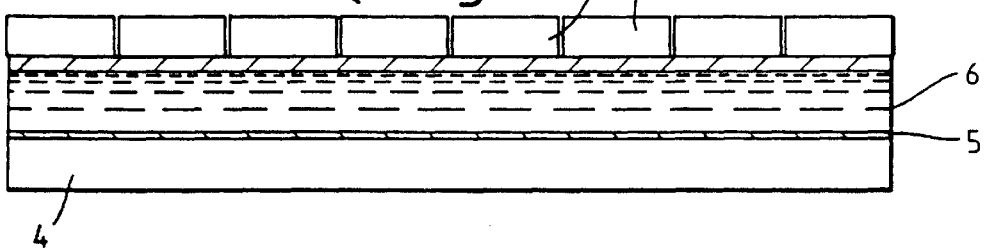
FIG. 2 is a sectional view of FIG. 1.

The display of FIGS. 1, 2 comprises a composite liquid crystal cell 1. At the top and a side edge of the composite cell 1 are column and row driver circuits 2, 3 which apply signal (data) and scanning (gate) voltages as described later. The composite cell is formed by a glass lower substrate 4 typically 1.5 mm thick and coated on its upper surface with a transparent tin oxide forming a common electrode 5.

On top of the base 4 is a layer 6, typically 50 $\mu$m thick, of polymer material encapsulating liquid crystal material; The polymeric material may be any one commonly used in this art. Suitable polymers include epoxy resins including thermosetting and thermoplastic epoxy resins. UV cured polymers, polyvinyl polymers such as polyvinyl alcohol, polyacrylates such as polymethyl-methacrylate, polyurethanes, polyesters and polyaryl-alkenes such as polystyrene. Preferred polymers are the epoxy resin which is a mixture of epichlorohydrin and bisphenol A and a curing agent, the polyurethane which is a mixture based on toluene diisocyanate, polyether glycols, methylenebisisoorthochloroanilin and various polyols, polymethylmethacrylate and polyvinyl alcohol.

Typical liquid crystal materials include those described in patent application GB 89 28,282.6 ie a mixture of at least two compounds, at least one of said compounds having a general formula I;

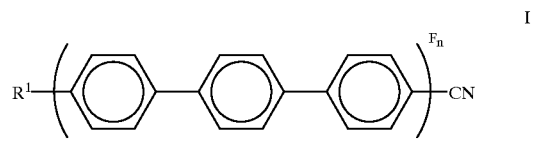

wherein n is 1 or 2, the fluoro substituent(s) may be in any of the available substitution positions and $R^1$ is $C_{1-12}$ alkynyl, hydrogen, R, RO or RCO where R is alkyl or perfluoroalky, and at least one other of said compounds having a general formula II:

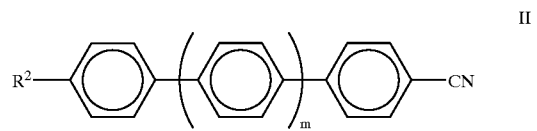

wherein m is 0 or 1 and $R^2$ is hydrogen or $C_{1-12}$ alkyl or alkoxy. Typically the liquid crystal material is between 15–90% by weight, preferably 30–80%, and the pore size is about 1–7 $\mu$m, typically 2–4 $\mu$m. The polymer layer 6 is fixed to the base 4 eg by uv curing adhesive 7 such as NORLAND 65 shown in more detail in FIG. 5. Alternatively the layer 6 may be formed direct onto the base 4.

An example of the layer 6 follows: Polyvinyl alcohol (PVA) (Vinol 205, Air Products) was purified by Soxhiet extraction with Methanol prior to use. To 15 g units of a 20weight % aqueous solution of the PVA was added 5 g units of a liquid crystal having the following composition:

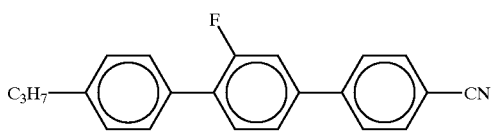

and

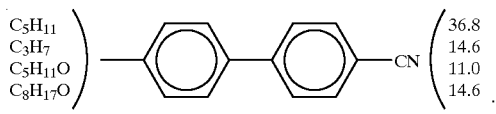

This has a nematic to isotropic phase chance at 79° C. a smectic to nematic change at less than −20° C., a birefringence of 0.264, and viscosity at 20° C. of 68 c St.

The PVA-liquid crystal mixture was emulsified using a laboratory stirrer. After degassing the emulsion to remove air bubbles, the emulsion was coated as thin layers onto a base plate. After drying for one hour, the material was allowed to cure at 85° C. for a further 24 hours. The material may be formed in large pieces that are subsequently cut to size.

On top of the polymer layer 6 is an upper substrate 8 formed by many small tiles 9 glued together to provide an integral unit. The upper plate is fixed to the polymer layer 6 eg by uv curing glue 7.

Figure 3:
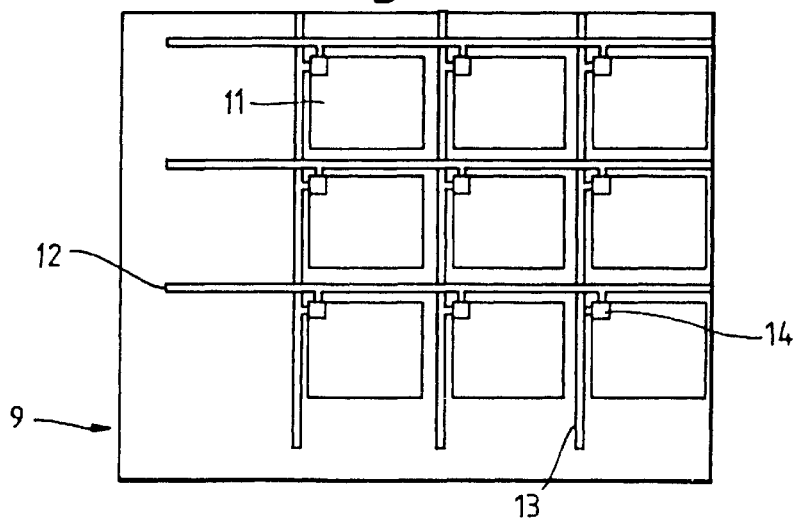
FIG. 3 is a plan view of one cell forming a part of FIG. 1.

Every tile 9, FIG. 3, has on its lower surface pixel elements 11 each defined by an area of transparent tin oxide; typically the pixel are 500 $\mu$m wide, 400 $\mu$m high, and separated by gaps of 100 $\mu$m. Between the rows of pixels are video source bus lines 12. Between each column of pixels are gate bus lines 13 and select bus lines 16. These bus lines 12, 13 are about 25–100 $\mu$m wide, 0.5–1 $\mu$m thick, and formed of metal e.g. Al. The bus lines 12, 13, and 16 are insulated from each other at all intersections by a layer of silicon oxide or silicon nitride. Associated with each pixel 11 is a non linear element 14 having connections to both the adjacent source select and gate bus lines 12. 13, 16 and to the pixel electrode 11.

Techniques and details of addressing display using non linear elements are well known and described for example in Liquid Crystal TV Displays, Principles and Applications of Liquid Crystal Displays, by E Kaneko, 1987, published by KTK Scientific Publishers, Tokyo; see particularly chapter 7.

As shown each pixel has a single electrode pair, so the display is limited to a monochrome display. The display may be configured to provide a multi colour display by providing groups of three electrodes at each pixel position. Each electrode in the group is connected to associated bus lines for independent addressing; also each electrode is associated with a red, green, or blue, filter. The electrodes may themselves be a coloured filter.

Figure 5:
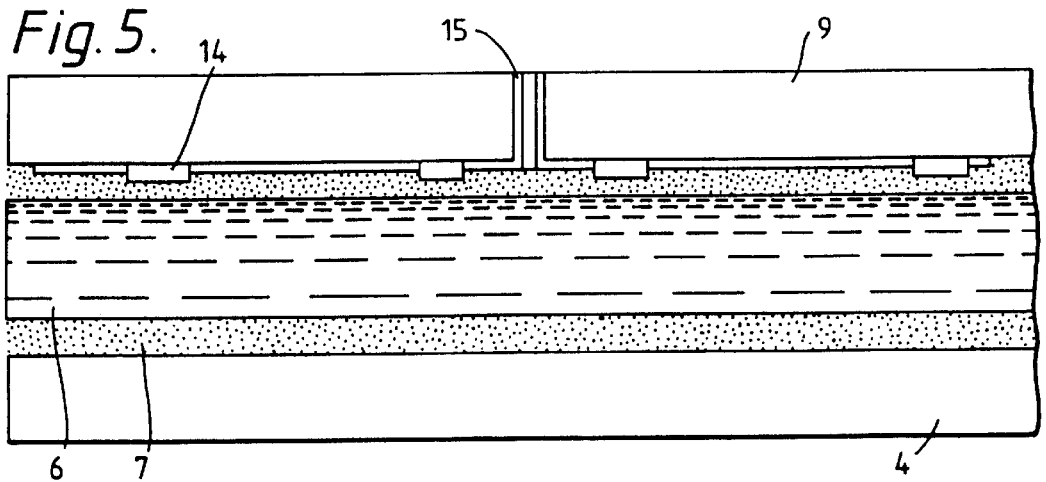
FIG. 5 is a sectional view of FIG. 4.

One example of a non linear element and techniques for switching will now be described with reference to FIGS. 9–11. FIG. 9 shows a section of a switched matrix circuit. It has gate bus lines 12 and data signal lines 13 with a thin film transistor (TFT) at each bus line interaction. The gate of each TFT 14 connects to the gate bus 12; the data bus lines connect to source electrodes; and the drain of each TFT 14 connects to a patch electrode 25 forming one plate of a capacitor 26. The bus lines 12, 13, TFT 14 and patch electrode 25 are on the lower surface of the upper plate 8 as shown in FIG. 5. The other plate of the capacitor 26 is the common electrode 5 on the lower substrate 4 (FIG. 1) and the liquid crystal material forms the dielectric medium. An additional storage capacitor 27 may be formed and connected in parallel at each pixel to assist in maintaining a necessary storage value sufficient for a whole frame time.

Each pixel intersection 11 is switched by scanning a gate voltage a row at a time to each gate bus 12 whilst all other gate bus lines are maintained at ground potential. Simultaneously suitable data signals are applied to each data bus line 13 to charge up the capacitors 26 and 27 to the necessary level for the required pixel display level. This continues with the whole display addressed in one frame time, then repeated for successive frame times. The result of this is that the charge stored by the capacitors 26, 27 on each addressing, control the field applied to each pixel and thus its display level.

FIGS. 10, 11 show in a diagrammatic form one construction of TFT 14. The glass substrate 9 has a series of gate bus lines 31 each with a short limb 32 forming a gate electrode at each pixel 11; suitable material for this bus line is Cr or Al, of thickness 0.5–1 $\mu$m and width 25–100 $\mu$m. At each TFT 14 the gate electrode 31 is covered by a silicon dioxide or aluminum oxide insulator 33. A patch 34 of semi conductor material partly covers the insulator 33; one suitable material is a stoichiometric amount of Cd and Se. Data bus lines 13, eg of Al 0.5–1 $\mu$m thick and 25–100 $\mu$m wide, are formed on the substrate 9 and run over the insulator 33 to connect with the semiconductor patch 34; the data bus line 13 form a TFT source electrode. Within the boundaries of the bus lines 12, 13 are pixel electrodes 25 which connect to the semiconductor patches 34 with a conducting strip 35 forming drain electrodes. The storage capacitor 27 (not shown in FIGS. 10, 11 ) is also formed with electrodes and a layer of eg silicon dioxide. When a sufficiently large voltage is applied to the gate electrode 32 by the gate electrode 12, the pixel electrode 25 connects to the source electrode 13.

Figure 4:
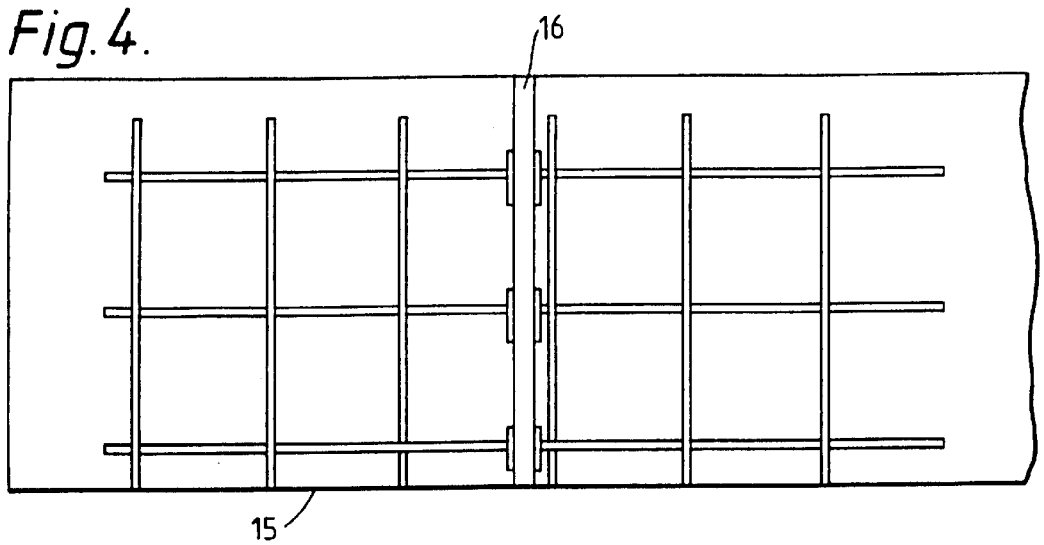
FIG. 4 is a plan view showing two cells joined together.

The source gate and select bus lines 12, 13, 16 extend to the edges of each tile 9 and are electrically continued round the edge. As seen more clearly in FIGS. 4 and 5 the edges 15 of each tile have source and bus lines 12, 13 formed thereon, for example by a photolithographic process or by silk screen printing. The edge bus lines are allowed to extend slightly round the corner to make electrical contact with the bus lines on the tile face. Alternatively a series of fine electrically separate conducting strips are formed on the edge by photolithographic processes or silk screen printing prior to deposition of the bus lines on the tile face. As a further alternative metal pins may extend through the glass for connecting behind the tile. Each bus line on the tile face is continued slightly round the corner on manufacture to make electrical contact with one or more of the fine conducting strips.

As a further alternative each tile has a series of fine holes formed through the thickness of the tile adjacent each edge 15. Conducting filaments fill these holes. The bus lines on the tile face will connect with one or more of these filaments. On the reverse face of each tile connection pads are formed over one or more filament. Thus each bus line is electrically connected to a connection pad on the opposite face of the tile 9. After assembly of all tiles the connection pads on adjacent tiles are bridged with a bonding wire as, for example, used in bonding between semiconductor chips and can pins.

The tiles 9 are held together at their edges by an anisotropic conductor and glue. Such a glue is formed by a suspension of conducting particles of copper in a matrix of epoxy resin. Typically the particles are less than 1 μm in size; the matrix may be H70S, H77, or Epo-Tek301 ™ (produced by Epoxy Technology Inc) and is a two component material with good flow characteristics.

A small bead of this glue is spread along the centre of an edge 15 of a tile 9. A second tile is brought into contact with this bead and the two tiles pressed together. This pressure causes deformation of the glue bead and localised contact between the conducting particles thereby forming a unidirectional conducting path between identical bus lines on the two tiles. Further tiles 9 can be joined in a similar manner to form the large upper substrate 8. After each tile is joined to another tile the combination is tested for electrical continuity to ensure the complete upper substrate is correctly produced.

Alternatively a strip of Anisolm AC-5052 anisotropic conductive film (available from Hitachi Chemical Europe GmbH) may be used. Alternatively conducting graphite fibres embedded in resin may be used. The fibres are aligned parallel to one another, of about 3 μm diameter and several tens of μm long as described by E Kaneko referenced above. (Sony Chemical Co. Technical Information: oriented conductive film connector 1984.) The resin/fibre mixture is placed on one tile edge and two tiles brought together at a temperature of around 110–130° C. This hot pressing together makes electric contrast between tile edges and the graphite fibres.

As an alternative to anisotropic glue providing electrical continuity between tiles, small solder bumps may be employed to give the desired connection. These solder bumps may be formed on the tile edges 15 in a known technology. The solder is distorted slightly as adjacent tiles are brought together. Instead of solder bumps on tiles edges, the bus lines may be continued round the tile edge and onto the rear surface. The solder may then be formed on the rear surface between tiles after the tiles have been glued together. When conducting pins are formed through the tile thickness and connected on the tile rear, the glue connecting the tiles may be a non conducting epoxy.

To take account of manufacturing tolerances on each tile 9 the precise gap between each tile may need to vary slightly in order that the overall dimensions are correct. This may be achieved by use of markers formed on the lower surface of each tile during manufacture of the non linear elements. Such markers are often used in semiconductor manufacture to align successive masks during processing. These markers allow individual tiles to be accurately positioned whilst the glue between tiles cures. Additionally or alternatively, the edges of each tiles may be formed with groves and projections so that adjacent tiles may be accurately located relative to one another, with a small amount of glue between each tile. After assembly of all the tiles to form the upper substrate 8 it is glued on top of the polymer layer 6.

FIGS. 6, 7 show how liquid crystal molecules are affected by an applied electric field to provide a visible display. As seen in FIG. 6 liquid crystal material 20 is encapsulated within a polymer matrix 21 to form the NCAP layer 6. With no applied electric field the liquid crystal molecules, more correctly the director, adopt a random ordering which is highly scattering to incoming light. When a suitable voltage is applied, eg 15 volts FIG. 7, the director lines up along the applied field direction. In this state the molecular ordering and the refractive indices of droplet and matrix match to give a highly transmissive sheet 6. Thus selective parts of the whole polymer layer 6 can be made transmissive on a light scattering background.

Figure 8:
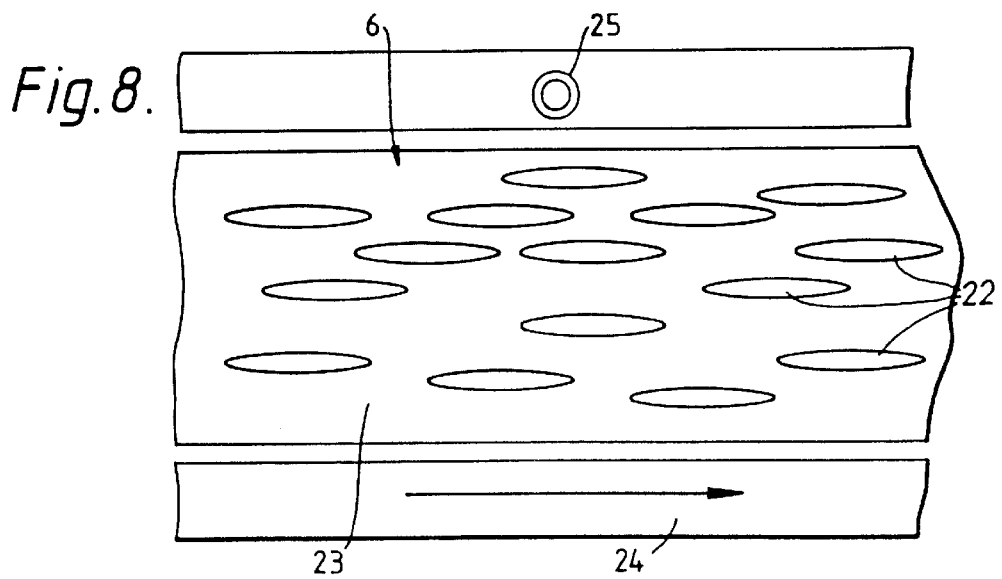
FIG. 8 is a sectional view of a stretched layer of polymer encapsulating liquid crystal material.

FIG. 8 shows a stretched polymer layer encapsulating nematic liquid crystal material 22 in elongated pores in a polymer matrix 23 to form a PDLC layer display operating in a Freedericksz mode device. The direction of stretching defines an optical axis for each encapsulated droplet. The layer 6 is arranged between crossed polariser 24 and analyser 25 with the direction of stretch at 45° to the optical axis of the polariser 24 and analyser 25. Light is transmitted in accordance with the equation:

$$I \sim \cos^2(\Delta n \cdot /\lambda)$$

where
I=light intensity
Δn=birefringence
d=layer thickness
λ=wavelength

For a positive dielectric anisotropy encapsulated nematic material, application of an electric field causes the director to reorientate parallel to the applied field, lowering $\Delta n \cdot d / \lambda$ and hence the amount of transmitted light. This arrangement may be modified by including a small amount, typically less than 2% of a dicroic dye in the liquid crystal material. Such a layer does not require use of the analyser 25.

In operation a large area display using eg diode non linear elements at each pixel is addressed as follows to display information. A scanning voltage, eg of about 5 volts, is applied to each gate bus line 12 in turn for about 60 μsec. Whilst the strobe is on a particular line a data voltage, eg of about 15 volts, is applied to selected signal bus lines 13 where ever information needs to be written. The effect of both source and gate voltage is to switch the non linear element 14 and charge the pixel electrode 11 very quickly to about 15 volts. The reverse impedance of the non linear element is high therefore on removal of the source voltage, the pixel remains charged for about 20 msec which is long enough to switch the liquid crystal material. Thus the strobe voltage Vs can address about 10000,000 pixels 11 (1024 lines) in 20 msec even though each pixel requires about 1 msec to switch to an ON state.

The large area of this invention may use about 8×8 tiles giving for example about 1024×1024 pixels.

In a modification the polymer layer 6 may be replaced by a free layer of liquid crystal material. To improve uniform spacing between lower substrate 4 and upper substrate 8 spacers may be formed on the lower surface of each tile 9 during processing before assembly into the upper substrate 8. Additionally the liquid crystal material may have small lengths of fibres or glass spheres uniformly mixed therein to act as spacers over the whole display.

With such a free layer of liquid crystal material the conventional types of liquid crystal displays can be produced, eg twisted nematic, super twisted nematic, phase change, with and without dyes, etc.

The displays can operate in a transmissive mode, or reflective mode with a reflecting rear surface.

The relative positions of lower substrate 4 and upper substrate 8 are for ease of description only, either may form the top surface of a display.

What is claimed is:

1. A large area liquid crystal display comprising:
a layer of liquid crystal material encapsulating polymer material is disposed between cell walls,
one cell wall comprised of an optically transparent material includes an optically transparent common sheet electrode,
the other wall being provided on one surface with a series of m data electrodes and a series of n gate electrodes arranged to form an m×n matrix of electrode intersections with a pixel shaped electrode at each intersection and a non linear element associated with each pixel electrode, the non linear element being connected between an adjacent data and gate electrode and to the pixel electrode, and data and gate electrode driver circuits for applying addressing voltages to each pixel, wherein the second wall is formed by a plurality of separate optically transparent addressing tiles electrically connected together to form a large single addressing cell wall, each tile comprising a substrate carrying data, gate, and pixel electrodes with an associated non linear element arranged in an m×n matrix, and means for electrically joining the data and gate electrodes on adjacent tiles.

2. The display of claim 1 wherein the data and gate electrodes on each separate addressing tile are continued round at least part of the cell edges.

3. The display of claim 1 wherein the electrodes on each separate addressing tile electrically passes through the tile near its edges to emerge and terminate in contact pads on the reverse side of the tile.

4. The display of claim 1 wherein the means for electrically joining the data and gate electrodes on adjacent tiles is a bead of anisotropic glue between adjacent tiles.

5. The display of claim 1 wherein the means for electrically joining the data and gate electrodes on adjacent tiles is a series of solder bumps between adjacent tile edges.

6. The display of claim 1 wherein the means for electrically joining the data and gate electrodes on adjacent tiles is an electrical conducting bridge on the reverse of each tile.

7. The display of claim 1 wherein the polymer material is a stretched layer with elongated pores containing the liquid crystal material.

* * * * *